(12) United States Patent
Gonda et al.

(10) Patent No.: US 11,942,650 B2
(45) Date of Patent: Mar. 26, 2024

(54) BATTERY MODULE WITH MULTIPLE SECONDARY BATTERIES

(71) Applicant: NGK INSULATORS, LTD., Nagoya (JP)

(72) Inventors: Yuichi Gonda, Nagoya (JP); Keiichi Mori, Ichinomiya (JP); Seiji Hayakawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 128 days.

(21) Appl. No.: 17/646,167

(22) Filed: Dec. 28, 2021

(65) Prior Publication Data

US 2022/0123407 A1    Apr. 21, 2022

Related U.S. Application Data

(63) Continuation of application No. PCT/JP2020/026308, filed on Jul. 3, 2020.

(30) Foreign Application Priority Data

Aug. 6, 2019  (JP) .................................. 2019-144598

(51) Int. Cl.
*H01M 50/209*  (2021.01)
*H01M 10/24*  (2006.01)
(Continued)

(52) U.S. Cl.
CPC ......... *H01M 50/209* (2021.01); *H01M 10/24* (2013.01); *H01M 10/613* (2015.04);
(Continued)

(58) Field of Classification Search
CPC ............. H01M 50/209; H01M 50/224; H01M 50/449; H01M 50/434; H01M 50/317;
(Continued)

(56) References Cited

U.S. PATENT DOCUMENTS 5,585,204 A * 12/1996 Oshida ................ H01M 50/209
429/62
9,293,791 B2   3/2016 Yamada et al.
(Continued)

FOREIGN PATENT DOCUMENTS

EP    3 675 270 A1    7/2020
JP    2010-056035 A   3/2010
(Continued)

OTHER PUBLICATIONS

International Search Report and Written Opinion (Application No. PCT/JP2020/026308) dated Sep. 29, 2020 (with English translation).

(Continued)

*Primary Examiner* — Jimmy Vo
(74) *Attorney, Agent, or Firm* — BURR PATENT LAW, PLLC

(57) ABSTRACT

Provided is a battery module including: a metal module housing that has a closed interior space; and multiple secondary batteries that have a vertically long shape and are housed vertically in the interior space and juxtaposed parallel to each other. The module housing has an upper excess space above the secondary batteries in the interior space, the upper excess space being capable of mitigating a pressure increase in the module housing due to ignition of gas generated in the event of an abnormality in the secondary batteries.

13 Claims, 14 Drawing Sheets

(51) Int. Cl.
*H01M 10/613* (2014.01)
*H01M 10/647* (2014.01)
*H01M 10/6556* (2014.01)
*H01M 10/6563* (2014.01)
*H01M 10/658* (2014.01)
*H01M 50/224* (2021.01)
*H01M 50/317* (2021.01)
*H01M 50/434* (2021.01)
*H01M 50/449* (2021.01)

(52) U.S. Cl.
CPC ..... *H01M 10/647* (2015.04); *H01M 10/6556* (2015.04); *H01M 10/6563* (2015.04); *H01M 10/658* (2015.04); *H01M 50/224* (2021.01); *H01M 50/317* (2021.01); *H01M 50/434* (2021.01); *H01M 50/449* (2021.01)

(58) Field of Classification Search
CPC ............. H01M 10/613; H01M 10/647; H01M 10/6556; H01M 10/6563; H01M 10/658; H01M 10/24
See application file for complete search history.

(56) References Cited

U.S. PATENT DOCUMENTS

| | | | |
|---|---|---|---|
| 10,290,847 | B2 | 5/2019 | Kitoh et al. |
| 10,686,177 | B2 | 6/2020 | Gonda et al. |
| 2010/0052692 | A1 | 3/2010 | Yano et al. |
| 2017/0200981 | A1 | 7/2017 | Yokoyama et al. |
| 2017/0214019 | A1 | 7/2017 | Yokoyama et al. |
| 2020/0006729 | A1 | 1/2020 | Hayakawa |

FOREIGN PATENT DOCUMENTS

| | | | | |
|---|---|---|---|---|
| JP | 2010-205509 A | | 9/2010 | |
| JP | 2014-049427 A | | 3/2014 | |
| JP | 2014-154240 A | | 8/2014 | |
| JP | 2014-179178 A | | 9/2014 | |
| JP | 2014179178 A | * | 9/2014 | |
| JP | 2014-197512 A | | 10/2014 | |
| JP | 2016-072207 A | | 5/2016 | |
| JP | 2018-018673 A | | 2/2018 | |
| KR | 20090052802 A | * | 5/2009 | .......... H01M 10/441 |
| WO | 2013/118561 A1 | | 8/2013 | |
| WO | 2016/067884 A1 | | 5/2016 | |
| WO | 2016/076047 A1 | | 5/2016 | |
| WO | 2017/086278 A1 | | 5/2017 | |
| WO | WO-2017086278 A1 | * | 5/2017 | ............ H01M 10/28 |
| WO | 2018/173110 A1 | | 9/2018 | |
| WO | 2019/069762 A1 | | 4/2019 | |
| WO | 2019/077953 A1 | | 4/2019 | |
| WO | WO-2019167689 A1 | * | 9/2019 | .......... H01M 10/613 |

OTHER PUBLICATIONS

Japanese Office Action (Application No. 2021-537625) dated Jan. 18, 2023 (with English translation) (8 pages).

* cited by examiner

BATTERY MODULE WITH MULTIPLE SECONDARY BATTERIES

CROSS-REFERENCE TO RELATED APPLICATIONS

This application is a continuation application of PCT/JP2020/026308 filed Jul. 3, 2020, which claims priority to Japanese Patent Application No. 2019-144598 filed Aug. 6, 2019, the entire contents all of which are incorporated herein by reference.

BACKGROUND OF THE INVENTION

1. Field of the Invention

The present invention relates to a battery module including multiple secondary batteries.

2. Description of the Related Art

In order to obtain high voltage and high current, stacked-cell batteries, which are made by combining multiple single cells, have been widely adopted. In a stacked-cell battery, a stack of multiple single cells connected in series or parallel is housed in one battery container. For example, Patent Literature 1 (WO2017/086278) discloses a zinc secondary battery in which multiple electrode cartridges including electrodes and separators (especially LDH separators described below) are housed in a sealed container.

In addition, in order to further increase capacity and output, it is also common to make a battery module with an array of multiple battery units that contain stacked-cell batteries. For example, Patent Literature 2 (WO2018/173110) discloses a battery module in which multiple rectangular cuboid-like battery units are housed in a frame structure, and mentions that it is preferable that the single cells of the multiple alkaline secondary batteries (e.g., nickel-zinc secondary batteries and zinc-air secondary batteries) be housed in the battery units, in the form of an assembled battery or a battery module.

Incidentally, it is known that in zinc secondary batteries such as nickel-zinc secondary batteries and zinc-air secondary batteries, metallic zinc precipitates from the negative electrode in the form of dendrite during charging, penetrates the air gap in the separator such as a non-woven fabric, and reaches the positive electrode, resulting in a short circuit. Such short circuits caused by zinc dendrites shorten the repetitive charge-discharge life. To address this problem, batteries including layered double hydroxide (LDH) separators that selectively allow hydroxide ions to permeate while preventing penetration of zinc dendrites have been proposed. For example, Patent Literature 3 (WO2013/118561) discloses the use of an LDH separator between the positive and negative electrodes in a nickel-zinc secondary battery. Patent Literature 4 (WO2016/076047) discloses a separator structure with an LDH separator fitted or bonded to a resin outer frame, and discloses that the LDH separator has such a high densification that it is gas impermeable and/or water impermeable. This literature also discloses that the LDH separator can be combined with a porous substrate. Patent Literature 5 (WO2016/067884) discloses various methods for obtaining a composite material (LDH separator) by forming an LDH dense film on the surface of a porous substrate. This method includes the step of uniformly attaching a starting material that can provide a starting point for LDH crystal growth to the porous substrate and hydrothermally treating the porous substrate in an aqueous solution of a raw material to form an LDH dense film on the surface of the porous substrate. Patent Literature 6 (WO2019/069762) discloses a method for efficiently manufacturing a negative electrode structure suitable for zinc secondary batteries (especially stacked-cell batteries thereof) that can prevent zinc dendrite extension by covering or wrapping the entire negative electrode active material layer with a liquid retention member and LDH separator.

CITATION LIST

Patent Literature

Patent Literature 1: WO2017/086278
Patent Literature 2: WO2018/173110
Patent Literature 3: WO2013/118561
Patent Literature 4: WO2016/076047
Patent Literature 5: WO2016/067884
Patent Literature 6: WO2019/069762

SUMMARY OF THE INVENTION

A conceivable way of increasing capacity and output is to make a battery module by arranging multiple secondary batteries in a module housing. However, since multiple secondary batteries are housed in a module housing, the risk of occurrence of an abnormal situation rises with an increase in the number of secondary batteries. The worst-case scenario for an abnormal situation in a secondary battery is ignition of the gas generated in the event of an abnormality in the secondary battery (in the case of hydrogen gas, hydrogen combustion may occur). Aside from that, as multiple battery modules can be installed in the same or adjacent locations to further increase capacity and output, it is desirable to prevent troubles (such as fire) that occur in one battery module from spreading to other battery modules. For these reasons, battery modules with a high level of safety have been required.

The inventors have recently found that a battery module with a high level of safety can be provided by providing an upper excess space above a secondary battery in the interior space of a metal module housing, which can mitigate the pressure increase in the module housing caused by the ignition of gas generated in the event of an abnormality in the secondary batteries.

Therefore, an object of the present invention is to provide a battery module that includes multiple secondary batteries and offers a high level of safety.

According to an aspect of the present invention, there is provided a battery module comprising:
  a metal module housing that has a closed interior space; and
  multiple secondary batteries that have a vertically long shape and are housed vertically in the interior space and juxtaposed parallel to each other,
  wherein the module housing has an upper excess space above the secondary batteries in the interior space, the upper excess space being capable of mitigating a pressure increase in the module housing due to ignition of gas generated in the event of an abnormality in the secondary batteries.

DETAILED DESCRIPTION OF THE INVENTION

Battery Module

Figure 1A:
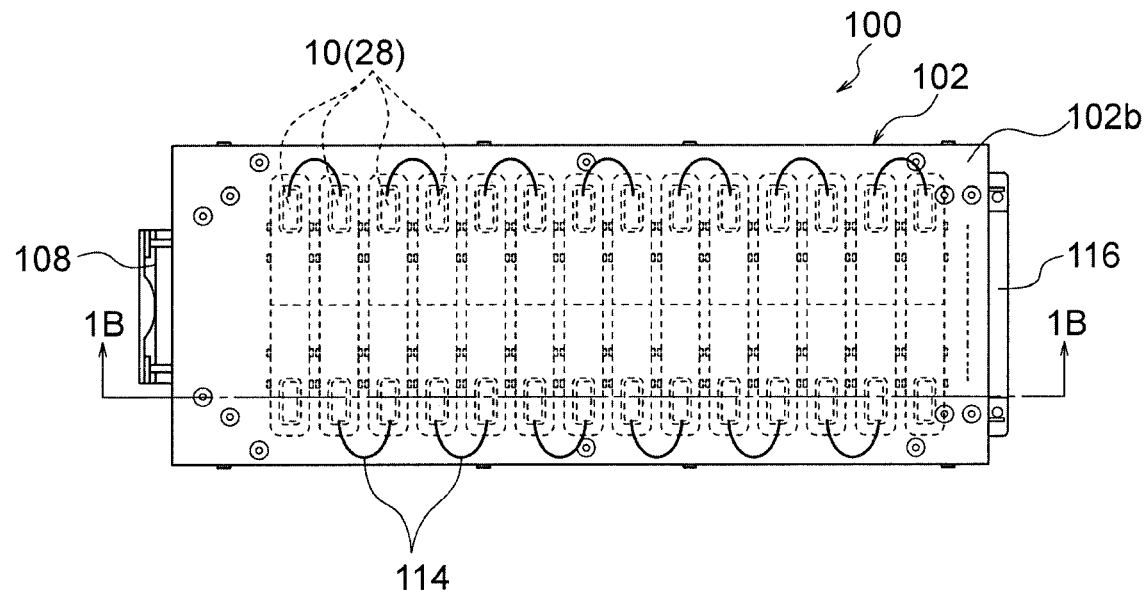
FIG. 1A is a top view of an example of a battery module of the present invention.
Figure 1B:
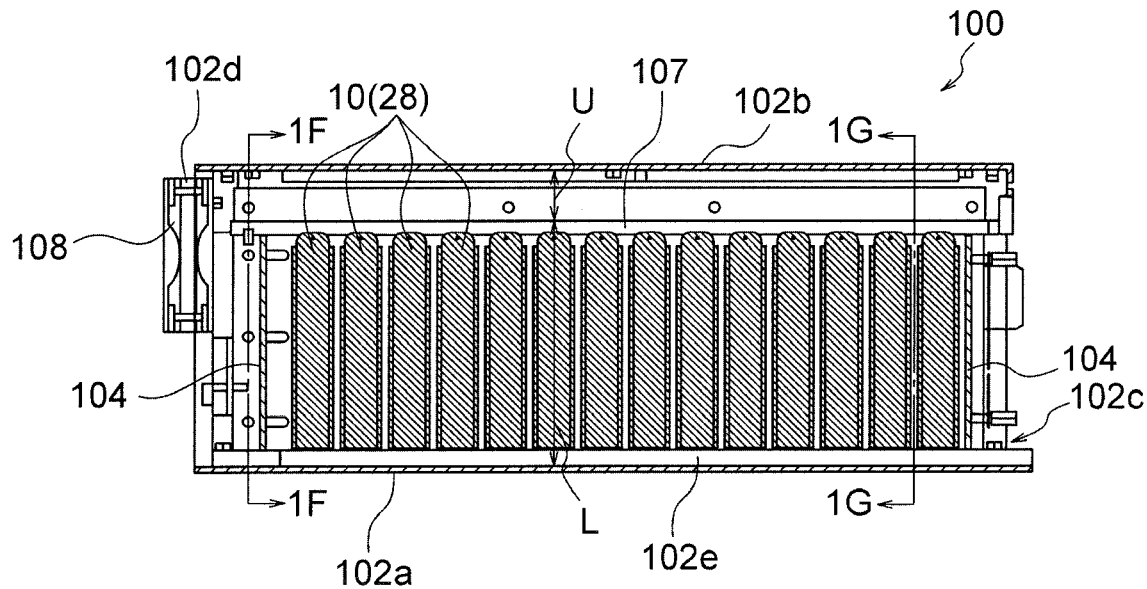
FIG. 1B is a cross-sectional view along line 1B-1B of the battery module shown in FIG. 1A.
Figure 1C:
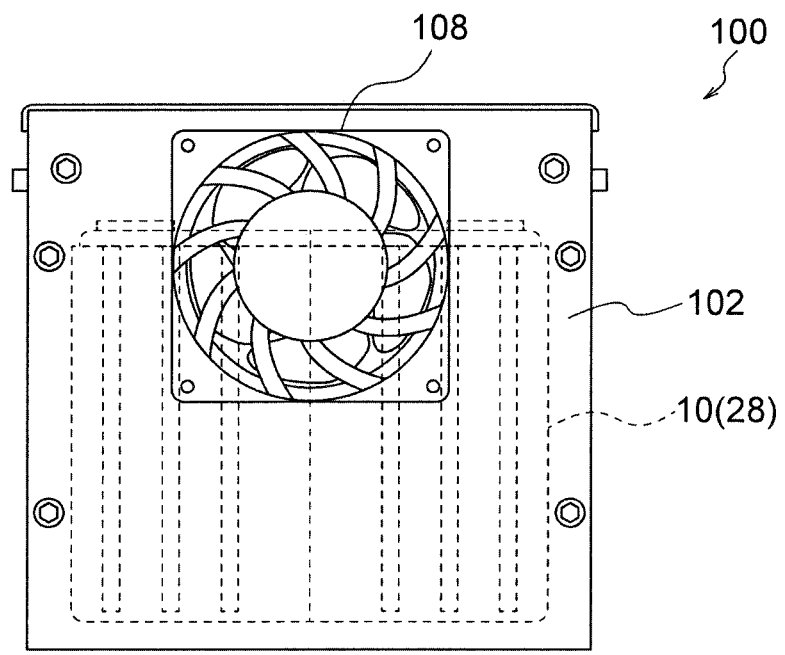
FIG. 1C is a left side view of the battery module shown in FIG. 1A.
Figure 1D:
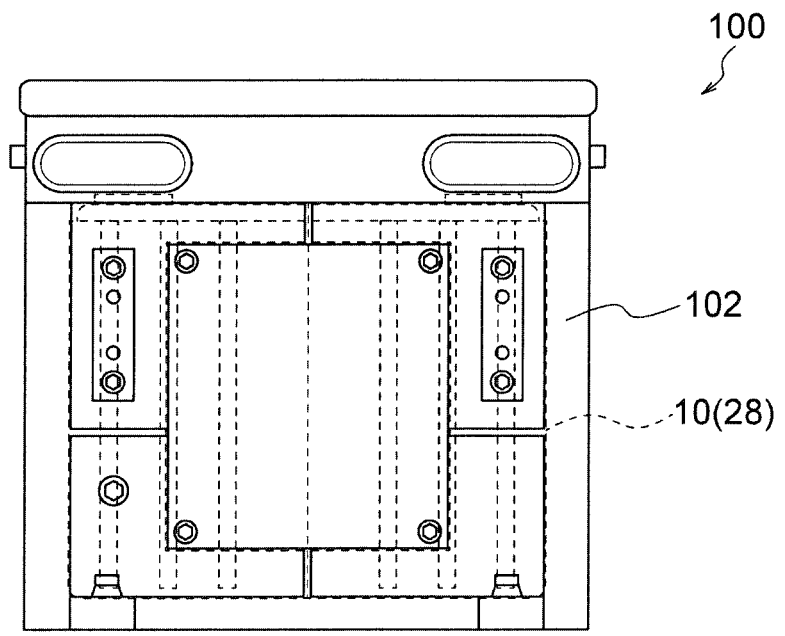
FIG. 1D is a right side view of the battery module shown in FIG. 1A.
Figure 1E:
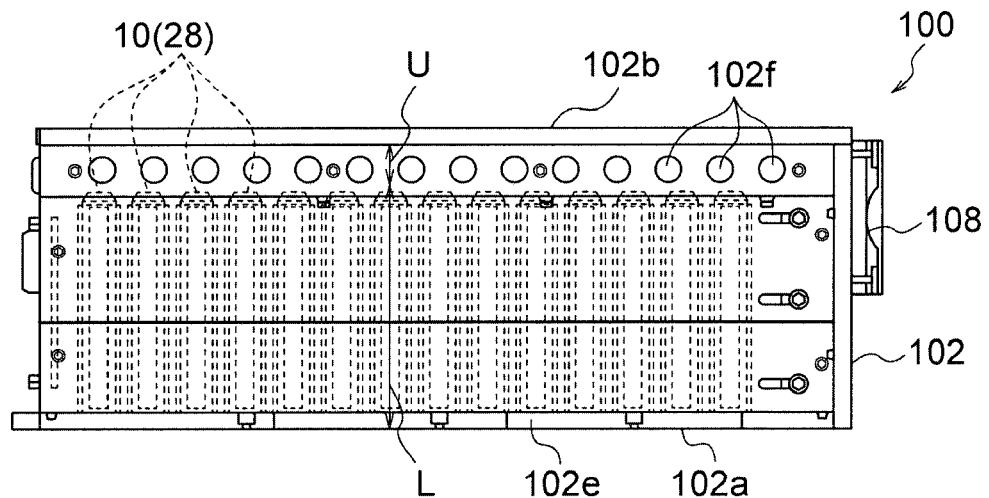
FIG. 1E is a rear view of the battery module shown in FIG. 1A.
Figure 1F:
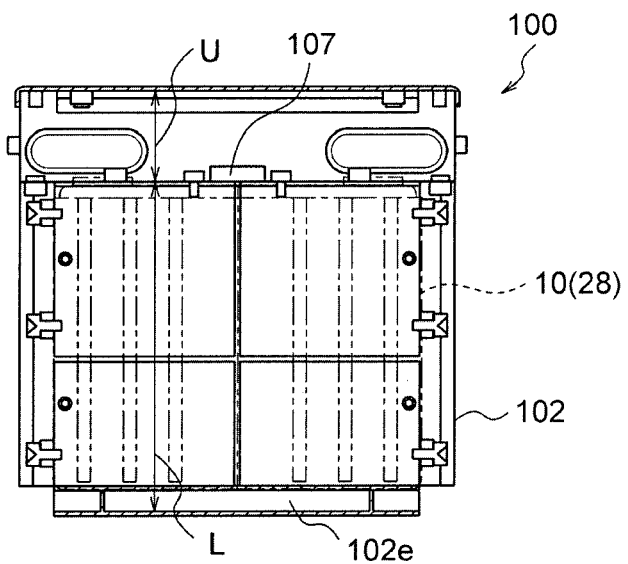
FIG. 1F is a cross-sectional view along line 1F-1F of the battery module shown in FIG. 1B.
Figure 1G:
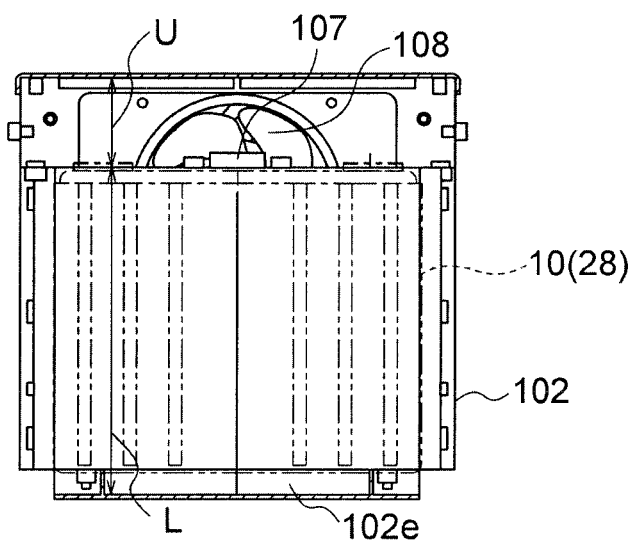
FIG. 1G is a cross-sectional view along line 1G-1G of the battery module shown in FIG. 1A.
Figure 1H:
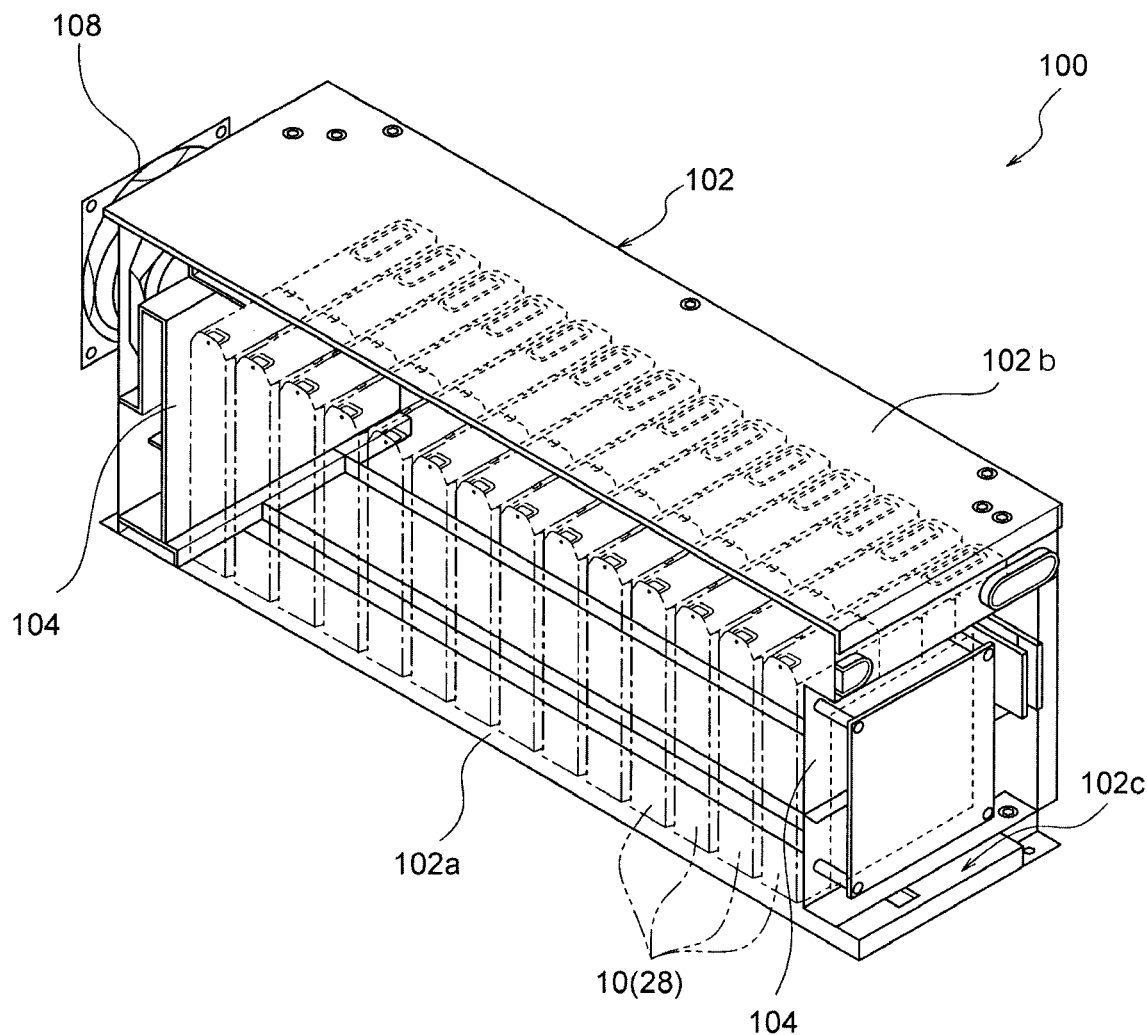
FIG. 1H is an exploded perspective view of the battery module shown in FIG. 1A.
Figure 2:
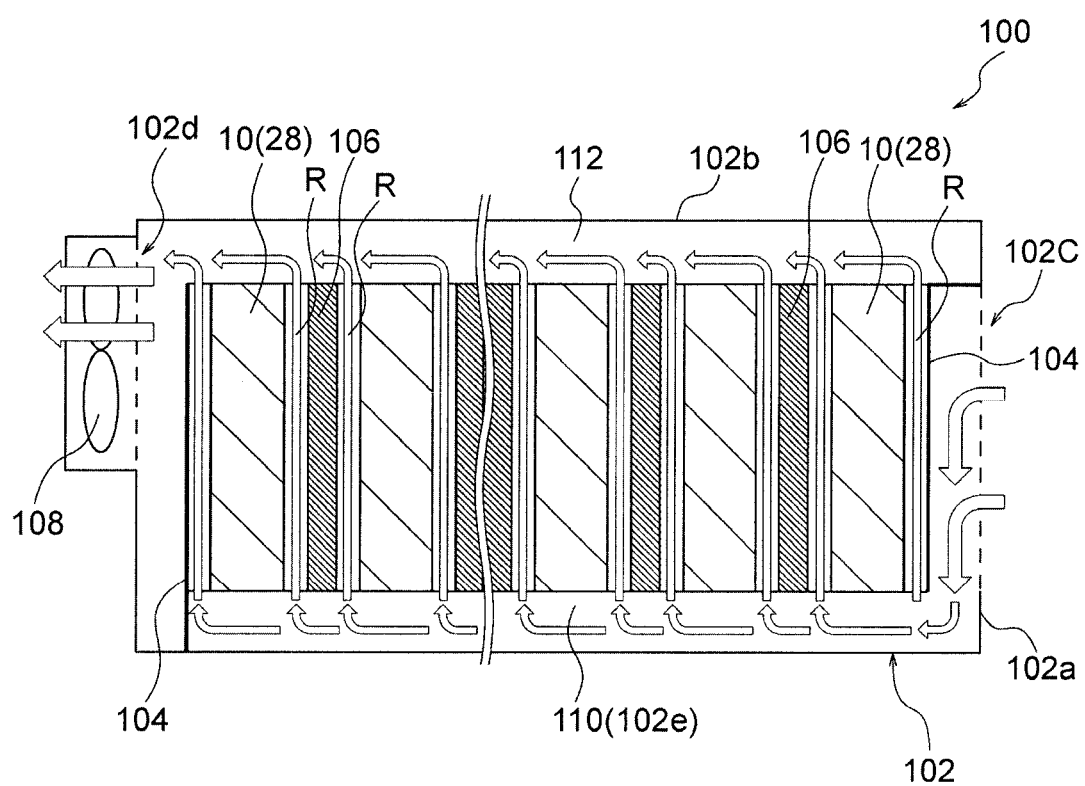
FIG. 2 is a schematic cross-sectional view conceptually showing the configuration of the battery module of the present invention.

FIGS. 1A to 1H show a specific mode of the battery module of the present invention, while FIG. 2 conceptually shows the configuration of the battery module of the present invention. The battery module 100 shown in FIGS. 1A to 1H and 2 includes a module housing 102 and multiple secondary batteries 10. The module housing 102 is a metal housing having a closed interior space, i.e., a metal lidded container. The secondary batteries 10 have a vertically long shape and are housed vertically in the interior space and are juxtaposed parallel to each other. The secondary batteries 10 may be of any type, but are preferably alkaline secondary batteries such as nickel-zinc secondary batteries, which will be described later. The module housing 102 has an upper excess space U, which is capable of mitigating a pressure increase in the module housing 102 due to ignition of gas generated in the event of an abnormality in the secondary batteries 10, above the secondary batteries in the interior space. Providing an upper excess space U, which is capable of mitigating a pressure increase in the module housing 102 due to ignition of gas generated in the event of an abnormality in the secondary batteries 10, above the secondary batteries 10 in the interior space of the metal module housing 102 in this way yields a battery module 100 that includes multiple secondary batteries 10 and offers a high-level of safety. In other words, the secondary batteries 10 may usually generate gas in the event of an abnormality, and in the worst case, the gas could conceivably ignite due to a short circuit or the like (in the case of hydrogen gas, hydrogen combustion could occur). In this regard, with this configuration of the present invention, the upper excess space U mitigates a pressure increase in the module housing 102 due to such gas ignition, thereby ensuring safety outside the module housing 102.

As mentioned above, since multiple secondary batteries 10 are housed in the module housing 102, the risk of an abnormality rises with an increase in the number of secondary batteries 10. Besides, considering the fact that multiple battery modules 100 can be installed in the same or adjacent locations in order to further increase capacity and output, it is also desirable to prevent troubles (such as fire) occurring in one battery module 100 from spreading to other battery modules 100. In this regard, the battery module 100 of the present invention can ensure a high level of safety to meet these needs by providing an upper excess space U.

In particular, when the secondary battery 10 is an alkaline secondary battery such as a nickel-zinc battery, alkaline secondary batteries are much safer in that they use an aqueous electrolyte such as an aqueous potassium hydroxide solution, compared to secondary batteries that use a non-aqueous electrolyte containing a flammable organic solvent. However, the worst-case scenario is that the decomposition of the aqueous electrolyte generates hydrogen, which may ignite due to a short circuit or other cause, resulting in hydrogen combustion. In this regard, with the configuration of the present invention, even if the secondary battery 10 ruptures due to hydrogen combustion, various troubles associated with the rupture (e.g., sudden increase in internal pressure, scattering of fragments, leakage of electrolyte, fire, and abnormal heat generation) can all be stopped or mitigated inside the module housing 102, thus ensuring safety outside the module housing 102.

The module housing 102 is a metal housing with a closed interior space, i.e., a metal lidded container. The closed interior space does not mean a completely sealed space, but rather a space defined to surround a group of secondary batteries 10 juxtaposed parallel to each other from above and below on all four sides, and it is desirable not to make it a completely sealed container in order to allow internal pressure to escape. For example, the module housing 102 preferably has a structure that allows internal pressure to escape to the outside at a point facing or connected to the interior space above the alkaline secondary batteries 10.

Figure 4:
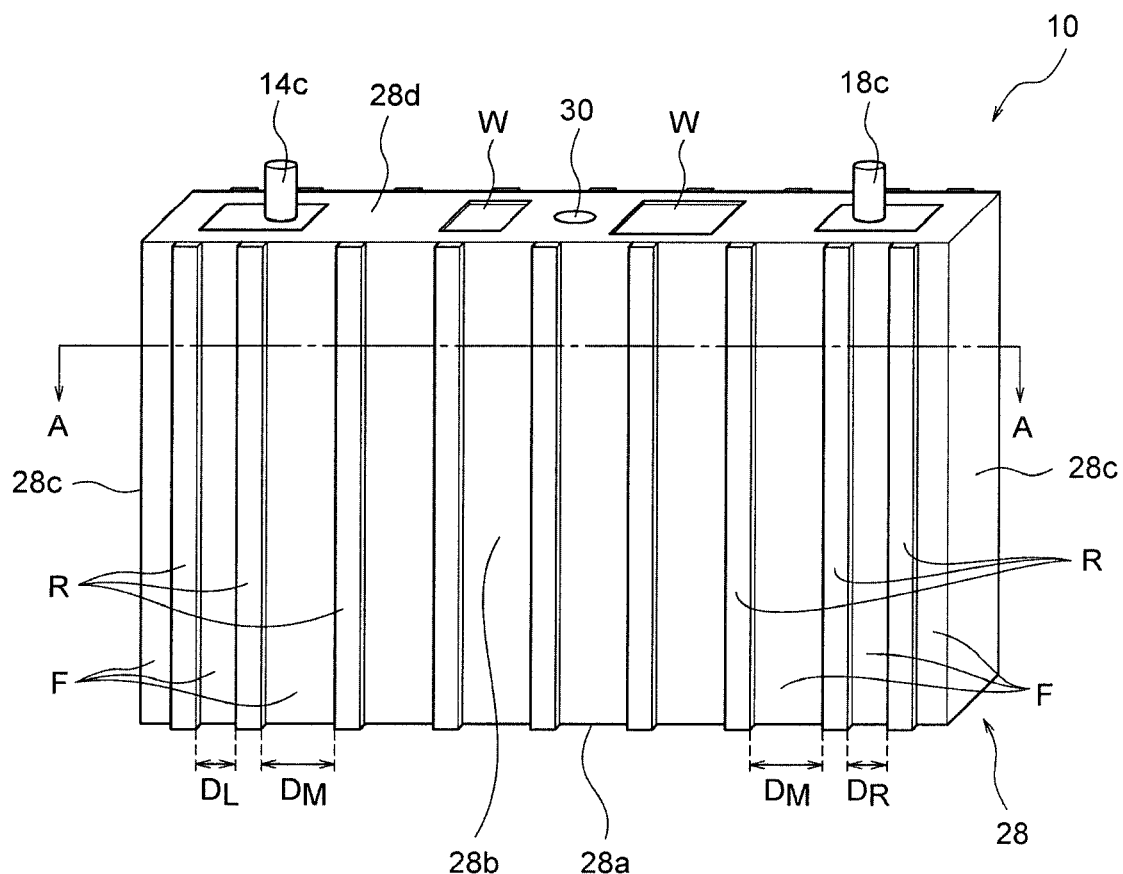
FIG. 4 is a perspective view of an example of an alkaline secondary battery used in the battery module of the present invention.

The module housing 102 is a metal lidded container including, for example, a container body 102a and a top lid 102b. In other words, both the container body 102a and the top lid 102b are composed of metal plates to ensure that the module housing 102 has sufficient pressure resistance, heat resistance, and strength. For example, as shown in FIG. 4 described below, when the lid part 28d of the box-shaped cases 28 of the secondary batteries 10 has vulnerable portions W that are preferentially ruptured in the event of an abnormality, the top lid 102*b* is placed near the vulnerable portions W of the secondary batteries 10; hence, pressure resistance, heat resistance, and strength sufficient to withstand the pressure and temperature at the time of rupture of the vulnerable portions W are desired. From this perspective, a steel plate or stainless steel plate is a preferred example of the metal plate for the top lid 102*b*. The thickness of the metal plate for the top lid 102*b* is preferably 1.0 to 3.0 mm, more preferably 1.5 to 2.5 mm. On the other hand, a steel plate or stainless steel plate is a preferred example of the metal plate for the container body 102*a*. The thickness of the metal plate for the container body 102*a* may be determined as appropriate taking into account the allowable weight as long as the desired pressure resistance or strength can be secured, but is preferably 0.8 to 2.5 mm, more preferably 1.0 to 2.0 mm. It is desirable that, in order to stop the increase in internal pressure caused by the rupture of the vulnerable portion W within the module housing 102, the top lid 102*b* be firmly fixed to the container body 102*a*. It is preferable that the top lid 102*b* be fixed to the container body through a bolt and nut connection so that the top lid 102*b* can be removed when necessary (for example, at the time of replacement or maintenance of the alkaline secondary batteries 10) while ensuring sufficient pressure resistance.

As mentioned above, the module housing 102 has an upper excess space U, which is capable of mitigating a pressure increase in the module housing 102 due to ignition of gas generated in the event of an abnormality in the secondary batteries 10, above the secondary batteries 10 in the interior space. The volume of the upper excess space U should be determined according to the specifications and the number of secondary batteries 10 so as to mitigate the pressure increase inside the module housing 102 caused by the ignition of gas generated in the event of an abnormality in the secondary batteries 10. To be specific, when the interior space consists of a lower space L which constitutes a lower part of the interior space with reference to top surfaces of the secondary batteries 10 (excluding components such as terminals and pressure release valves extending from the top surfaces), and an upper excess space U, $0.1 \leq V_U/(V_L+V_U) \leq 0.4$, more preferably $0.1 \leq V_U/(V_L+V_U) \leq 0.2$ is preferably satisfied, where the volume of the lower space L is $V_L$ and the volume of the upper excess space U is $V_U$. Note that the lower space L refers to the space constituting the lower part of the interior space of the module housing 102 with reference to the top surfaces of the secondary batteries 10, and its volume $V_L$ refers to the total volume including the secondary batteries 10 and other components disposed in the lower space L and the gas flow path under the secondary batteries 10. The upper excess space U refers to the space constituting the upper part of the interior space of the module housing 102 with reference to the top surfaces of the secondary batteries 10, and its volume $V_L$ refers to the total volume including the components (e.g., electrode terminals, current collecting components, and wiring) disposed in the upper excess space U.

It is desirable that an air flow path be formed in the module housing 102 to cool the secondary batteries 10. For this reason, the module housing 102 preferably further includes a shield plate 104 that defines a gas flow path together with the inner surface of the module housing 102 and the outer surfaces of the secondary batteries 10. In this case, in order to efficiently cool the secondary batteries 10, as indicated by the arrows in FIG. 2, the gas flow path is preferably configured to allow air to flow from one side of the module housing 102 to the opposite side of the module housing 102 through gaps between adjacent secondary batteries 10 and gaps between each secondary battery 10 and the shield plate 104, to cool the multiple secondary batteries 10. Accordingly, it is preferred that an air inlet 102*c* be disposed on one side of the module housing 102 (upstream of the flow path) while an air outlet 102*d* is disposed on the opposite side of the module housing 102 (downstream of the flow path). More preferably, a cooling fan 108 is provided at the air outlet 102*d*. The cooling fan 108 can be a small ventilation fan. With this configuration, air flows through the module housing 102 by activating the cooling fan 108, and the secondary batteries 10 can be efficiently cooled.

Preferably, the inner bottom surface of the module housing 102 has a recess 102*e*. The recess 102*e* functions as a gas flow path and is configured to be capable of receiving an electrolyte that may leak from a secondary battery 10 in the event of an abnormality in the secondary battery 10. With this configuration, the efficiency of cooling the secondary batteries 10 can be enhanced by allowing air to flow below the secondary batteries 10, while the electrolyte leaking from a secondary battery 10 in the event of an abnormality can be received in the recess 102*e*, effectively preventing the electrolyte from leaking outside the module housing 102. The depth of the recess 102*e* is, but not limited to, 3 to 20 mm, more preferably 5 to 15 mm.

Figure 5:
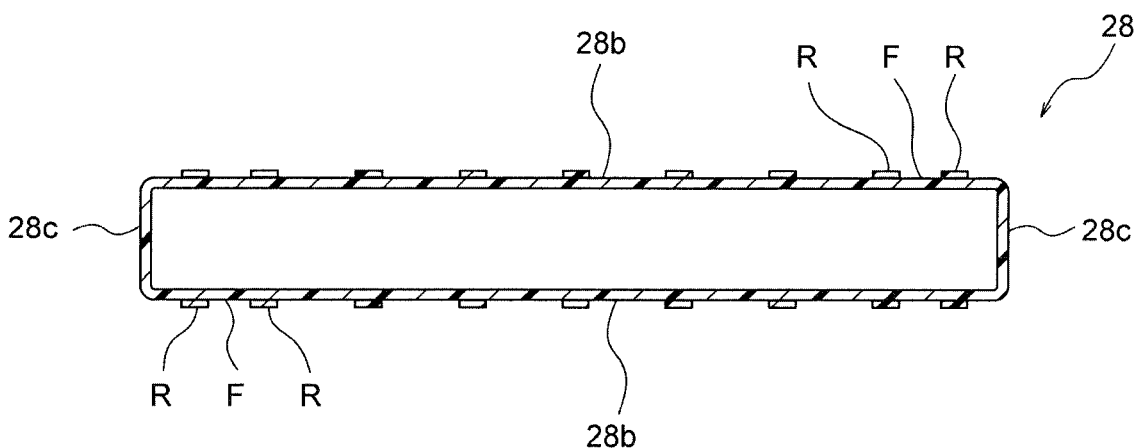
FIG. 5 is a cross-sectional view along line A-A of the box-shaped cases of the alkaline secondary battery shown in FIG. 4.

Therefore, as shown in FIG. 2, it is preferable to partition an intake flow path 110 (part of which can be the recess 102*e*), which supplies air from the air inlet 102*c* under the secondary batteries 10, and an exhaust flow path 112, which leads the air that escapes upward through the gap between the alkaline secondary batteries 10 to the air outlet 102*d*. The exhaust flow path 112 includes the upper excess space U. In this case, the gaps between the secondary batteries 10 also constitute flow paths. However, as shown in FIGS. 4 and 5 below, if the box-shaped cases 28 of the secondary batteries 10 have ribs R, the ribs R can act as spacers, thereby forming longitudinal ventilation holes and ensuring excellent heat dissipation. In order to secure and not to block the exhaust flow path 112, the lid part 28*d* of the box-shaped cases 28 is preferably separated from the top lid 102*b* by a predetermined distance which is preferably 10 to 50 mm, more preferably 20 to 30 mm. Similarly, in order to ensure and not to block the intake flow path 110, the bottom 28*a* of the box-shaped cases 28 is preferably separated from the bottom of the container body 102*a* by a predetermined distance which is preferably 3 to 20 mm, more preferably 5 to 15 mm. A way of holding the bottom 28*a* of the box-shaped cases 28 higher than the bottom of the module housing 102 is to provide a recess 102*e* as described above, or provide a ventilatable spacer such as a frame or rail at the bottom of the module housing 102 and place the secondary batteries 10 (i.e., the box-shaped cases 28) thereon.

Figure 3A:
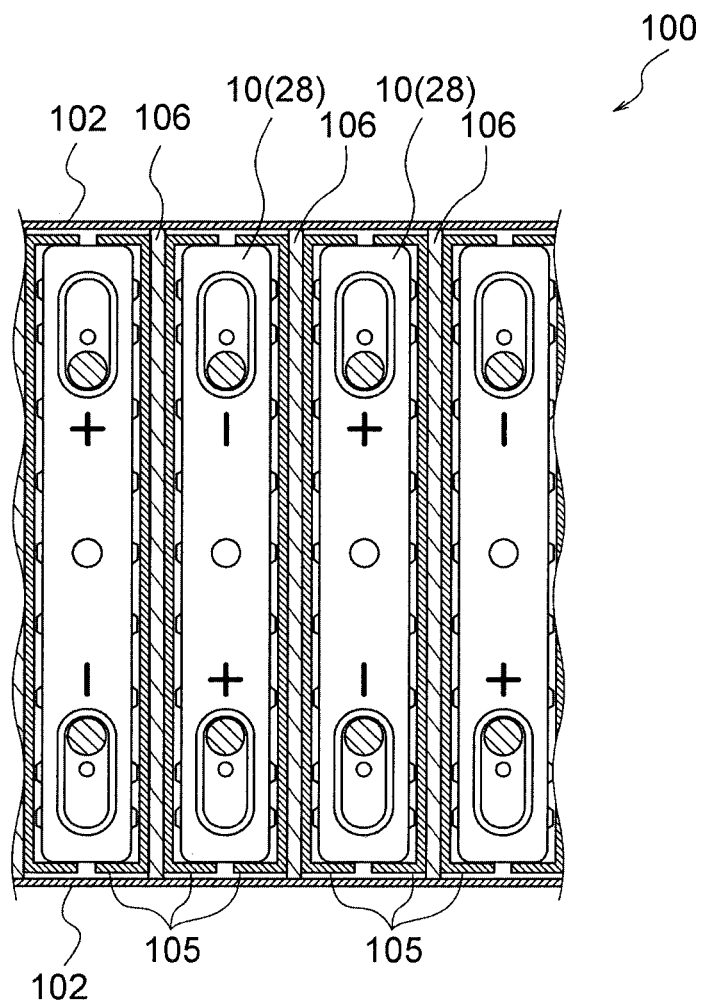
FIG. 3A is a schematic top view of an example arrangement of a fire-retardant plate and a metal plate in the battery module of the present invention.
Figure 3B:
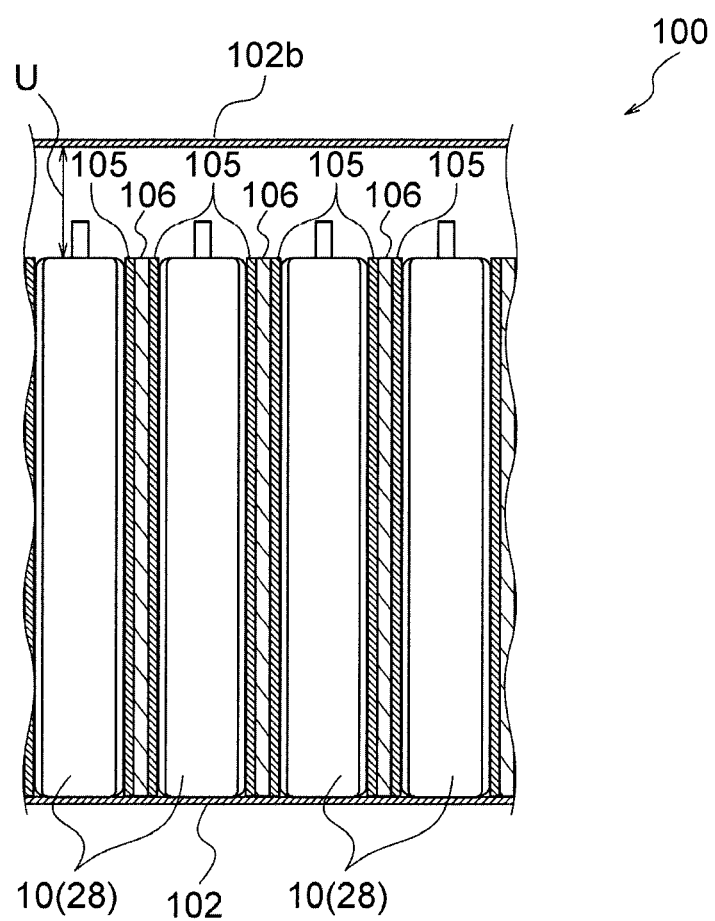
FIG. 3B is a schematic cross-sectional view of the arrangement of the fire-retardant plate and the metal plate in the battery module shown in FIG. 3A.

As shown in FIGS. 3A and 3B, it is preferable to further provide a fire-retardant plate 106 and/or heat-insulating plate between adjacent secondary batteries 10. When the box-shaped cases 28 of the secondary batteries 10 are made of resin, if the box-shaped cases 28 adjoin each other, a fire in one box-shaped case 28 may spread to other box-shaped cases 28. However, such fire spread can be prevented by providing a fire-retardant plate 106 between adjacent box-shaped cases 28. The fire-retardant plate 106 may be replaced with a heat-insulating plate which is expected to have a heat insulating effect to, when a secondary battery 10 reaches an abnormally high temperature, block the transfer of heat to the adjacent secondary battery 10. In any case, in order to achieve these effects more effectively, it is particularly preferable to adopt a configuration shown in FIG. 3A in which the side ends of each fire-retardant plate 106 or heat-insulating plate reach the side walls of the module housing 102, thereby separating adjacent secondary batteries 10 (box-shaped cases 28) from each other in such a way that they cannot spread fire. It is also preferable that, as shown in FIG. 3B, the upper ends of the fire-retardant plates 106 do not reach the top lid 102b of the module housing 102, be located at approximately the same height as the secondary batteries 10, and be configured so as not to obstruct the exhaust flow path 112 in the module housing 102. Various known fire-retardant plates, for example, embossed mica plates can be used as the fire-retardant plates 106.

As shown in FIGS. 3A and 3B, the sides of each secondary battery 10 are surrounded by one or more metal plates 105, and the gap between the sides of the secondary batteries 10 and the metal plates 105 preferably forms part of the gas flow path. Surrounding the sides of each secondary battery 10 with the metal plates 105 ensures, even in the event of the deformation of the fire-retardant plates 106 or heat insulating plates, a desired flow path avoiding blockage of the flow path (e.g., burial of the ribs R) due to the deformation. Therefore, the metal plates 105 are preferably provided at least on the side of each secondary battery 10 that faces the fire-retardant plate 106, meaning that all sides of each secondary battery 10 should not necessarily be surrounded by the metal plates 105. For example, fire-retardant plates 106 are not necessary on the module housing 102 side (or the shield plate 104 side) of the secondary batteries 10 located at both ends of the group of secondary batteries 10 that are juxtaposed, so metal plates 105 should not necessarily be provided. The metal plates 105 can be made of any material but are, for example, steel plates or stainless steel plates. Also, the metal plates 105 can be made in any thickness but are preferably in the range of 0.5 to 2.0 mm, more preferably in the range of 0.5 to 1.0 mm.

The multiple secondary batteries 10 are preferably held being pressurized by each other in the direction in which the multiple secondary batteries 10 are juxtaposed. In other words, the secondary batteries 10 are desirably pressurized from the outside to maximize the battery performance. For example, if Each secondary battery 10 is an LDH separator-mounted zinc secondary battery (e.g., a nickel-zinc secondary battery), pressurization is expected to minimize the gap between the negative electrode and the LDH separator that allows the growth of zinc dendrites, thereby more effectively preventing zinc dendrite extension. This pressurization can be brought in any way but preferably by fixing the shield plate 104 which can be achieved with a simple structure which does not require additional components. In other words, the shield plate 104 should be in direct contact or indirect contact (via spacers, for example) with both ends or one end of the group of secondary batteries 10 that are juxtaposed, and fixed in a position where pressure can be applied to the group of secondary batteries 10.

As shown in FIG. 1E, a side portion of the module housing 102 may have multiple vulnerable portions 102f that have a smaller thickness than other portions of that side portion. In this case, it is preferable that the vulnerable portions 102f be preferentially breakable with respect to the other portions due to an unacceptable increase in pressure in the module housing 102 caused by ignition of gas generated in the event of an abnormality in the secondary batteries 10. Providing such vulnerable portions 102f in the side portion of the module housing 102 has the advantage of limiting the area of the module housing 102 to be destructed to a desired location without impairment of the pressure resistance, heat resistance, and strength of the top lid 102b. The thickness of the vulnerable portions 102f is not limited to a particular value as long as it is determined taking into account the thickness of the other portions of the side portion of the module housing 102. For example, if the thickness of the side portion of the module housing 102 is 1.0 to 1.5 mm, the thickness of the vulnerable portions is preferably 0.5 to 1.0 mm.

Figure 6:
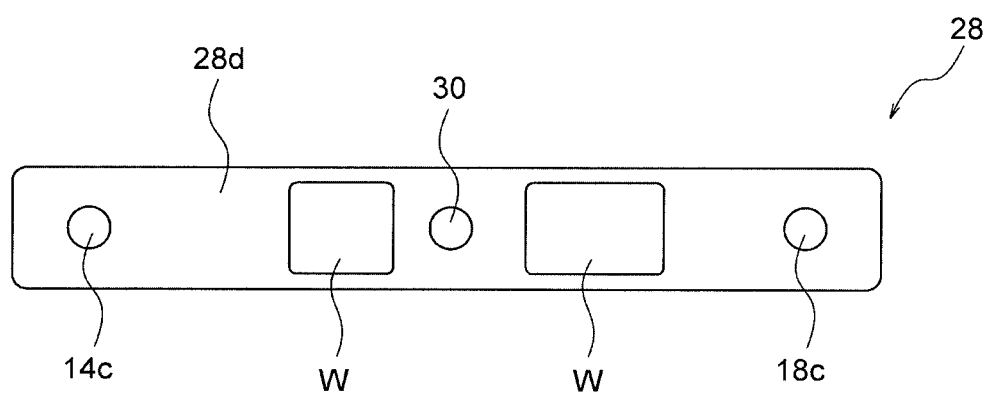
FIG. 6 is a top view of the lid part of the box-shaped case of the alkaline secondary battery shown in FIG. 4.

As shown in FIGS. 4 and 6, which will be described in detail later, each secondary battery 10 preferably has a pressure release valve 30 in its top surface, which can release the gas from the secondary battery 10 at a predetermined working pressure or more. In this case, the battery module 100 is preferably provided with a metal plate 107 provided in the direction in which the multiple secondary batteries 10 are juxtaposed so as to cover the pressure release valves 30 of the multiple secondary batteries 10 from above. In this way, when gas containing electrolyte is discharged from the pressure release valve 30, the electrolyte is prevented from scattering over a wide area, which minimizes contamination of the inner wall of the module housing 102.

The multiple secondary batteries 10, which are preferably series-connected by wiring 114, may be parallel-connected. The battery module 100 is preferably mounted with a CMU (cell monitoring unit) 116 which can be used to control the secondary batteries 10.

Alkaline Secondary Battery

Figure 7:
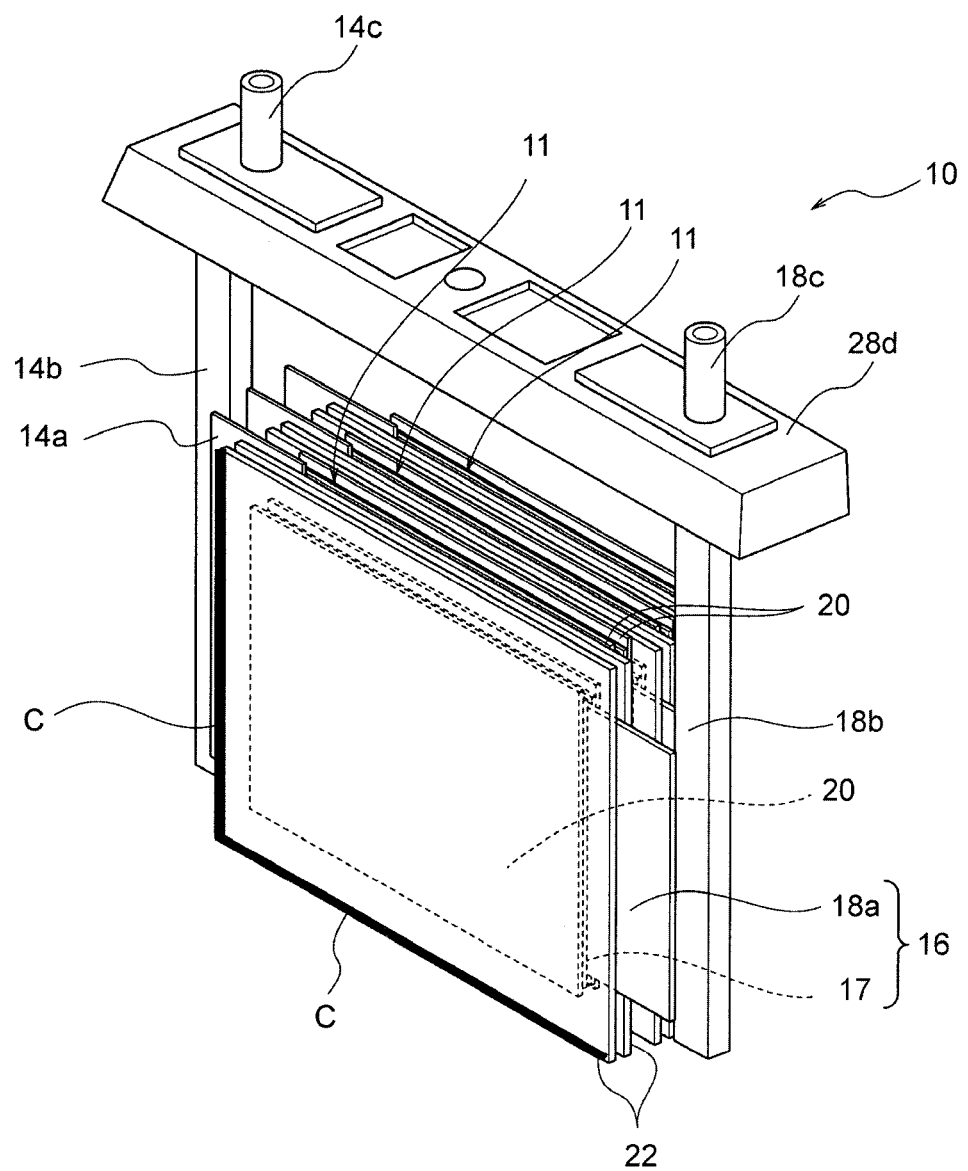
FIG. 7 is a perspective view showing an example internal configuration of the alkaline secondary battery shown in FIG. 4.
Figure 8:
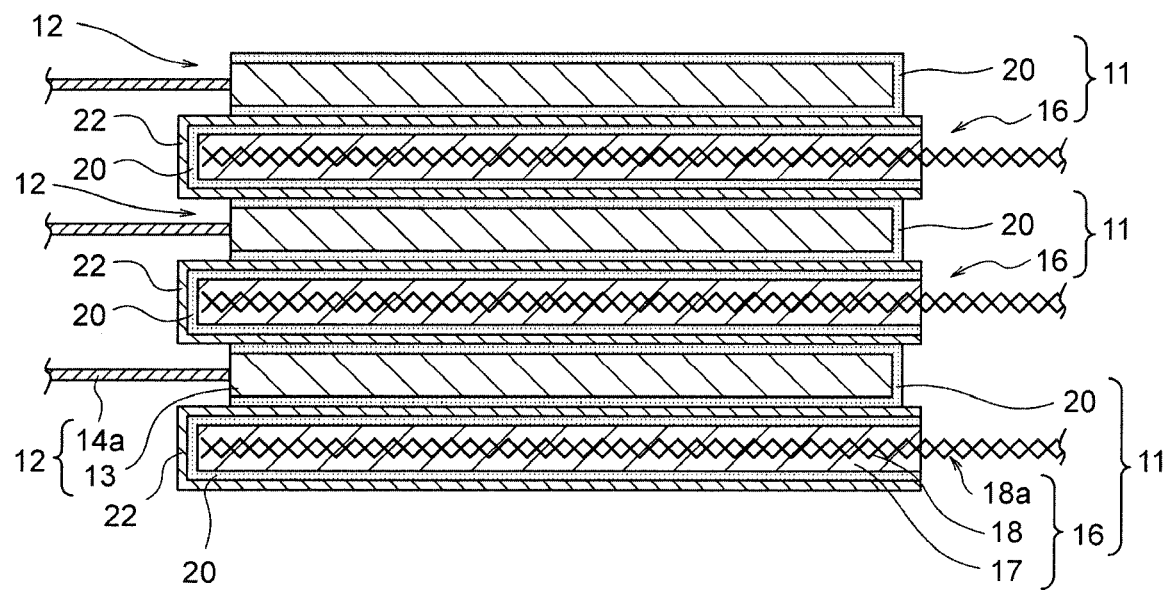
FIG. 8 is a schematic cross-sectional view conceptually showing the layer structure of the alkaline secondary battery shown in FIG. 7.

As mentioned above, a preferred secondary battery 10 used in the battery module 100 of the present invention is an alkaline secondary battery such as a nickel-zinc secondary battery. FIG. 4 shows a preferred example of an alkaline secondary battery of the present invention. The alkaline secondary battery 10 shown in FIG. 4 includes a stacked-cell battery and a box-shaped case 28 in which the stacked-cell battery is housed in a vertical orientation. The box-shaped case 28 is made of resin. As shown in FIGS. 7 and 8, the stacked-cell battery consists of a stack of multiple single cell elements 11 having the configuration of an alkaline secondary battery, and is advantageous in that it can provide high voltage and high current. As shown in FIGS. 4 to 6, the box-shaped case 28 has a bottom 28a, a pair of long-side walls 28b parallel to the stacked-cell battery, a pair of short-side walls 28c perpendicular to the stacked-cell battery, and a lid part 28d. The lid part 28d has a vulnerable portion W that has a smaller thickness than the other portion of the lid part 28d. In this way, providing the lid part 28d of the resin box-shaped case 28 in which the alkaline secondary battery 10 is housed, with a vulnerable portion W that has a smaller thickness than the other portion, minimizes damage caused by a sudden increase in the internal pressure of the battery due to hydrogen combustion or other causes. In other words, when the internal pressure of the battery suddenly rises due to hydrogen combustion or other causes, the vulnerable portion W is preferentially and locally destroyed before the entire box-shaped case 28 is destroyed, thus avoiding the overall destruction of the box-shaped case 28 and thus improving safety. In addition, since the vulnerable portion W is provided in the lid part 28d, in the case of housing in the module housing 102 as shown in FIG. 4, if the top lid 102b of the module housing 102 is preferentially designed to be pressure-resistant and heat-resistant and fixed to the container body 102a, even in the event of rupture of the vulnerable portion W due to hydrogen combustion in the alkaline secondary battery 10, various troubles (such as a sudden increase in internal pressure, scattering of fragments, leakage of electrolyte, fire, and abnormal heat generation) associated with the rupture can all be stopped within the module housing 102 (especially in the top lid 102b), thereby sufficiently securing safety outside the module housing 102.

As shown in FIGS. 4 to 6, the box-shaped case 28 has a bottom 28a, a pair of long-side walls 28b parallel to the stacked-cell battery, a pair of short-side walls 28c perpendicular to the stacked-cell battery, and a lid part 28d. Preferably, the alkaline secondary battery 10 further includes a positive electrode terminal 14c and a negative electrode terminal 18c, and the positive electrode terminal 14c and the negative electrode terminal 18c extend from the lid part 28d. A stacked-cell battery, which is not shown in FIGS. 4 to 6, is a stack of multiple single cell elements 11, i.e., an assembly of multiple single cell elements 11 as shown in FIGS. 7 and 8. The typical basic shape of the box-shaped case 28 is a rectangular parallelepiped, but not necessarily a perfect rectangular parallelepiped, and can be partially curved or partially uneven as long as the overall general shape is a box shape.

The box-shaped case 28 is preferably made of resin. The resin for the box-shaped case 28 is preferably a resin having resistance to alkali metal hydroxides such as potassium hydroxide, more preferably polyolefin resin, ABS resin, or modified polyphenylene ether, even more preferably ABS resin or modified polyphenylene ether.

As shown in FIG. 4, the lid part 28d preferably has a vulnerable portion W that has a smaller thickness than the other portion of the lid part. In this case, the vulnerable portion W is preferably provided between the positive electrode terminal 14c and the negative electrode terminal 18c. The thickness of the vulnerable portion W is preferably 0.1 to 1.0 mm, more preferably 0.2 to 0.9 mm, even more preferably 0.3 to 0.8 mm. The thickness of the portion of the lid part 28d other than the vulnerable portion W is preferably 1.0 to 3.0 mm, more preferably 1.5 to 2.5 mm, even more preferably 1.7 to 2.3 mm. The thickness of the vulnerable portion W is preferably 0.1 to 0.6 times, more preferably 0.1 to 0.4 times, even more preferably 0.2 to 0.3 times the thickness of the portion of the lid part 28d other than the vulnerable portion W. The thickness of the portion of the box-shaped case 28 other than the lid part 28d is preferably 1.0 to 4.5 mm, more preferably 1.5 to 3.5 mm, even more preferably 2.0 to 2.5 mm.

With the vulnerable portion W, when the internal pressure is excessively increased by the gas generated in the battery during abnormal operations such as over-charge, over-discharge, and short circuits (in the worst case scenario, when hydrogen combustion occurs), the vulnerable portion W is selectively destroyed by the internal pressure to prevent or minimize electrolyte leakage, and the reinforcing part of the module housing 102 can be limited within the portion of the top lid 102b near the vulnerable portion W (which fact removes the need for reinforcing the entire module housing 102). Another advantage of having the vulnerable portion W on the lid part 28d is more stable opening pressure (smaller opening pressure variations) than having the vulnerable portion W in the long-side wall 28b. In other words, if the vulnerable portion W is provided in the long-side wall 28b, in the completed battery module 100, the long-side wall 28b including the vulnerable portion W receives pressure and is subjected to extra stress which is not the internal pressure of the battery, which interferes with opening pressure stability. In contrast, in the lid part 28d, no force other than the internal pressure of the battery is applied even if the battery module 100 is completed, so that the opening pressure of the vulnerable portion W can be stabilized.

The percentage of the plan view area of the vulnerable portion W to the plan view area of the entire lid part 28d is preferably 10 to 40%, more preferably 15 to 30%, even more preferably 20 to 25%. The "plan view area of the entire lid part 28d" refers to the entire area enclosed by the outer edge of the lid part 28d when viewed from above, and includes not only the main part of the lid part 28d (including the vulnerable portion VV) but also the area occupied by the accessories attached to the lid part 28d, such as the positive electrode terminal 14c, the negative electrode terminal 18c, and the pressure release valve 30. The number of vulnerable portions W is not limited and may be one, but may be two or more as shown in FIG. 4, in which case it is preferable to have two or more vulnerable portions W separated from each other. In this way, the pressure release valve 30 can be placed between the vulnerable portions W (for example, in the center of the lid part 28d).

A pressure release valve 30 capable of releasing gas from the box-shaped case 28 at a predetermined working pressure or higher is preferably provided in the portion of the lid part 28d other than the vulnerable portions W. In this case, it is preferable that the burst pressure (or working pressure) of the vulnerable portions W be higher than the working pressure of the pressure release valve 30. In this way, the vulnerable portions W can be destroyed only in an abnormal situation where the internal pressure rises to the extent that the pressure release valve 30 can no longer cope with it, without impairing the function of the pressure release valve 30. For example, it is preferable that the burst pressure (or working pressure) of the vulnerable portions W is 0.30 to 0.55 MPa and the working pressure of the pressure release valve 30 is 0.10 to 0.20 MPa. In other words, the pressure release valve 30 is designed to deal with gradual pressure changes, such as gradually discharging accumulated gas during normal battery operation, while the vulnerable portions W are designed to release abnormal pressure during a sudden pressure increase in abnormal situations.

In a preferred mode of the present invention, the outer surface of the pair of long-side walls 28b has a flat surface F and multiple ribs R which protrude from the flat surface F in a ridged manner. The multiple ribs R are preferably separated and provided parallel in the longitudinal direction. Providing the multiple ribs R on the flat outer surface of the long-side walls 28b of the box-shaped case 28 in this way makes it possible to ensure, for the battery module 100 made as shown in FIGS. 1A to 1H and 2, excellent heat dissipation while maintaining a shape suitable for pressure application. In other words, a battery unit including a stacked-cell battery such as a nickel-zinc battery inside a case is desirably pressurized from the outside of the case in order to maximize the battery performance. This is because it is expected to minimize the gap that is located between the negative electrode and the LDH separator and allows the growth of zinc dendrites, thereby preventing zinc dendrite extension more effectively. For this purpose, the side shape of the case should be as flat as possible so that pressure can be applied to individual battery units when multiple battery units are arranged into a module. However, if the side portion of the case is flat, the battery units cannot release the heat generated by the battery units well because the battery units are in close contact with each other, or in the case of inserting inclusions such as fire-retardant plates 106 and metal plates 105 between the battery units, the battery units are in close contact with those inclusions. In this regard, each alkaline secondary battery 10 in this embodiment has multiple ribs R on the flat outer surface of the long-side walls 28b, so that when the battery module 100 is made as shown in FIGS. 1A to 1H and 2, the ribs R can function as spacers to form longitudinal ventilation holes, thereby ensuring excellent heat dissipation. In particular, this excellent heat dissipation can be more desirably achieved by, as shown in FIG. 2, allowing airflow to pass through the gaps defined by the ribs R in the direction of the arrow from the bottom of the battery module 100. Pressurizing the long-side walls 28b in the thickness direction toward the outside of the battery module 100 while ensuring such excellent heat dissipation allows the box-shaped case 28 to be flexed to apply pressure to the single cell elements 11.

The ribs R preferably have a height of 1.0 to 10 mm, more preferably 1.0 to 4.0 mm, even more preferably 1.2 to 3.5 mm, particularly preferably 1.4 to 3.0 mm, most preferably 1.5 to 2.5 mm with respect to the flat surface F. Within these ranges, it is possible to achieve excellent heat dissipation when the battery module 100 is completed, and also to improve the battery energy density by minimizing wasted space. The width of the ribs R is preferably 2.5 to 8.0 mm, more preferably 3.0 to 7.5 mm, even more preferably 3.5 to 7.0 mm, particularly preferably from 4.0 to 6.5 mm, most preferably 4.5 to 6.0 mm, from the viewpoint of both securing heat dissipation and applying pressure.

It is preferable that the ribs R be provided in such a way that the width of the ribs R gradually or stepwise becomes thicker in the direction from the bottom 28a to the lid part 28d, in order to facilitate release from a mold when the box-shaped case 28 is manufactured. The cross-sectional shape of the ribs R may be any shape such as rectangular, curved, or trapezoidal shape, but a trapezoidal shape is preferred from the viewpoint of release from the mold.

The number of ribs R for each long-side wall 28b is not limited, but preferably 5 to 11, more preferably 7 to 10, even more preferably 8 to 9. When the number of ribs R for each long-side wall 28b is five or more, the distance DL between the rib R closest to the left end of the long-side wall 28b (the connection portion with the short side wall 28c) and the rib R second closest to this left end, and the distance $D_R$ between the rib R closest to the right end of the long-side wall 28b (the connection portion with the short-side wall 28c) and the rib R second closest to this right end are preferably shorter than the distance $D_M$ between the other ribs R away from both ends (i.e., left end and right ends) of the long-side wall 28b. Hence, the portions near both ends of the long-side walls 28b of the box-shaped case 28 (i.e., the portions near the short-side walls 28c) can be locally reinforced, suppressing the expansion of the box-shaped case 28 (especially the expansion in the thickness direction of the case 28) caused by the gas generated in the battery during abnormal operations such as overcharging, over-discharge, and short circuits. In particular, an excess space where electrodes do not reach is likely to be formed in the vicinity of both ends of the long-side walls 28b, and the gas generated in the event of an abnormal operation may accumulate there and intensively apply excessive internal pressure to the box-shaped case 28, but the box-shaped case 28 can be given strength to withstand such internal pressure.

Each alkaline secondary battery 10 may be any secondary battery using an alkaline electrolyte (typically an alkali metal hydroxide solution), but is preferably a zinc secondary battery using zinc for the negative electrode. Thus, it can be a nickel-zinc secondary battery, a silver-zinc oxide secondary battery, a manganese-zinc oxide secondary battery, or various other alkaline zinc secondary batteries. For example, the positive electrode preferably contains nickel hydroxide and/or nickel oxyhydroxide, whereby the zinc secondary battery is a nickel-zinc secondary battery.

Figure 9:
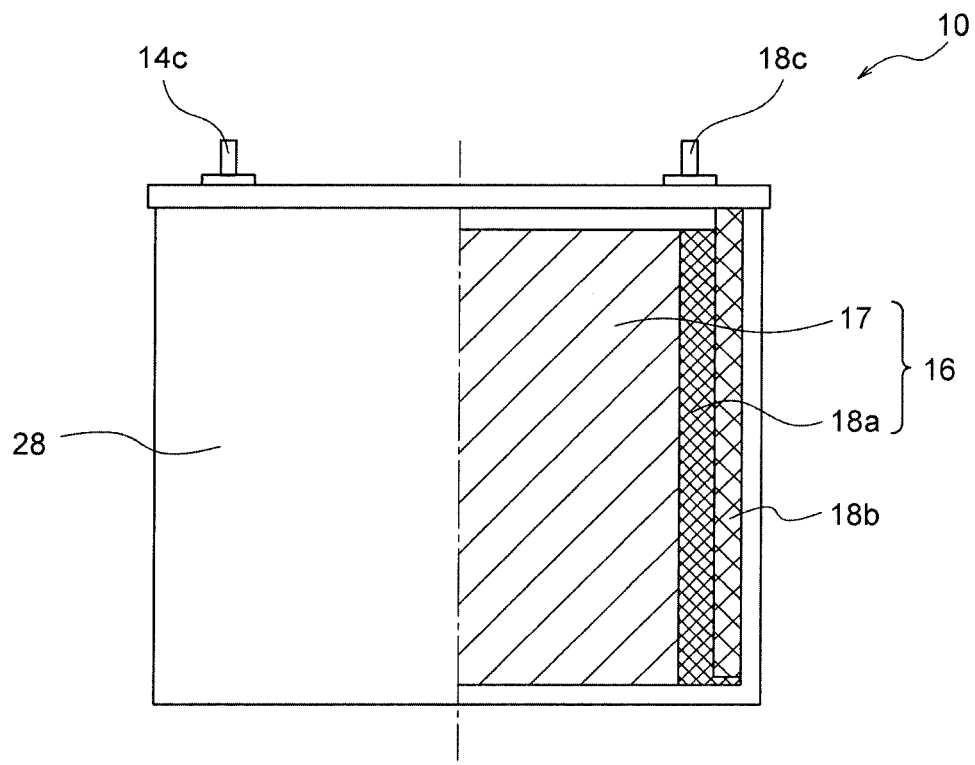
FIG. 9 shows the external and internal structure of the alkaline secondary battery shown in FIG. 7.

The case where the alkaline secondary battery 10 is a zinc secondary battery will be described below with reference to FIGS. 7 to 9. The alkaline secondary battery 10 (i.e., zinc secondary battery) shown in FIGS. 7 to 9 includes single cell elements 11. Each single cell element 11 includes a positive electrode plate 12, a negative electrode plate 16, a layered double hydroxide (LDH) separator 22, and an electrolyte (not shown in the drawing). The positive electrode plate 12 includes a positive electrode active material layer 13 and, if required, a positive electrode current collector 14. The negative electrode plate 16 includes a negative electrode active material layer 17 and, if required, a negative electrode current collector 18. The negative electrode active material layer 17 contains at least one material selected from the group consisting of zinc, zinc oxide, zinc alloys, and zinc compounds. The positive electrode active material layer 13 and the negative electrode active material layer 17 are separated from each other by the LDH separator 22. For example, it is preferable that the LDH separator 22 cover or wrap the entire negative electrode active material layer 17. An "LDH separator" herein is defined as a separator containing LDH and/or LDH-like compound that selectively passes hydroxide ions by exclusively utilizing the hydroxide ion conductivity of the LDH and/or LDH-like compound. An "LDH-like compound" herein refers to a hydroxide and/or oxide with a layered crystalline structure that may not be called LDH but is similar to LDH, and can be considered as an LDH equivalent. However, in a broader definition, "LDHs" can be interpreted to include not only LDHs but also LDH-like compounds. Typically, the positive electrode active material layer 13, the negative electrode active material layer 17, and the LDH separator 22 are quadrilateral (typically rectangular) in shape. Preferably, the positive electrode current collector 14 has a positive electrode current collector tab 14a extending from one side of the positive electrode active material layer 13, and the negative electrode current collector 18 has a negative electrode current collector tab 18a extending, beyond the edge of the LDH separator 22, from one side of the negative electrode active material layer 17 opposite to the positive electrode current collector tab 14a. Consequently, it is preferable that the single cell elements 11 be capable of collecting current from opposite sides through the positive electrode current collector tab 14a and negative electrode current collector tab 18a. In addition, the outer edges of at least two adjacent sides C of the LDH separator 22 (except for one side overlapping with the negative electrode current collector tab) are preferably closed. This configuration makes it possible to provide a zinc secondary battery (especially a stacked-cell battery) that can prevent zinc dendrite extension without the need for complicated sealing and bonding between the LDH separator 22 and the battery container, in a simple configuration that is easy to assemble and collect current.

The positive electrode plate 12 includes a positive electrode active material layer 13. The positive electrode active material layer 13 is made of any material selected as appropriate from known positive electrode materials according to the type of zinc secondary battery. For example, in the case of a nickel-zinc secondary battery, a positive electrode containing nickel hydroxide and/or nickel oxyhydroxide is used. The positive electrode plate 12 further includes a positive electrode current collector (not shown in the drawing), and the positive electrode current collector has a positive electrode current collector tab 14a extending from one side of the positive electrode active material layer 13. A preferred example of the positive electrode current collector is a nickel porous substrate such as a foamed nickel plate. In this case, for example, a positive electrode plate composed of a positive electrode and a positive electrode current collector can be preferably fabricated by uniformly applying a paste containing an electrode active material such as nickel hydroxide to a porous nickel substrate and drying it. At that time, it is also preferable to stamp the dried positive electrode plate (i.e., positive electrode/positive electrode current collector) to prevent the electrode active material from falling off and to improve the electrode density. The positive electrode plate 12 shown in FIG. 8 includes a positive electrode current collector (e.g., foamed nickel), which is not shown in the drawing though. This is because the positive electrode current collector is fully integrated with the positive electrode active material layer 13, and the positive electrode current collector cannot be depicted separately. It is preferable that the alkaline secondary battery 10 further include a positive electrode current collector plate 14b connected to an end of a positive electrode current collector tab 14a, and, it is more preferable that multiple positive electrode current collector tabs 14a be connected to one positive electrode current collector plate 14b. In this way, current can be collected with a simple and space-efficient configuration, and connection to the positive electrode terminal 14c is made easier. In addition, the positive electrode current collector plate 14b itself may be used as a positive electrode terminal.

The negative electrode plate 16 includes a negative electrode active material layer 17. The negative electrode active material layer 17 contains at least one material selected from the group consisting of zinc, zinc oxide, zinc alloys, and zinc compounds. In other words, zinc may be contained in the form of zinc metal, zinc compound, or zinc alloy, as long as it has electrochemical activity suitable for the negative electrode. Preferred examples of negative electrode materials include zinc oxide, zinc metal, and calcium zinc oxide, but mixtures of zinc metal and zinc oxide are more preferred. The negative electrode active material layer 17 may be in the form of a gel or mixed with an electrolyte to form a negative electrode composite material. For example, a gelled negative electrode can be easily obtained by adding electrolyte and a thickener to the negative electrode active material. Examples of the thickener include polyvinyl alcohol, polyacrylates, CMC, and alginic acid. Polyacrylates are preferred because of its excellent chemical resistance to strong alkalis.

The zinc alloy should be a zinc alloy that does not contain mercury or lead and is known as a mercury-free zinc alloy. For example, a zinc alloy containing 0.01 to 0.1 mass % of indium, 0.005 to 0.02 mass % of bismuth, and 0.0035 to 0.015 mass % of aluminum is preferred because it is effective in inhibiting hydrogen gas generation. In particular, indium and bismuth are advantageous in improving the discharge performance. The use of a zinc alloy for a negative electrode can improve safety by slowing down the rate of self-dissolution in alkaline electrolyte, thereby suppressing hydrogen gas generation.

The negative electrode material may be formed in any shape but preferably in the form of powder so that the surface area can be increased and high current discharge can be dealt with. In the case of a zinc alloy, the average particle diameter of a preferred negative electrode material is in the range of 3 to 100 μm in short diameter. Within this range, the material has a large surface area and is therefore suitable for high current discharge, and also easy to mix uniformly with electrolyte and gelling agent, making it easy to handle during battery assembly.

Figure 11:
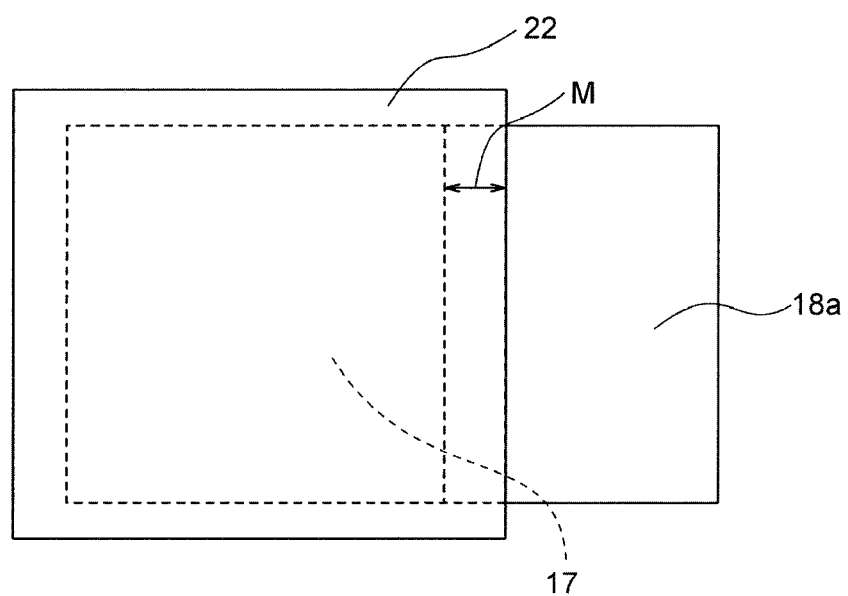
FIG. 11 is a schematic view of the area covered with the LDH separator in the negative electrode plate shown in FIG. 10A.

The negative electrode plate 16 can further include a negative electrode current collector 18. Preferably, the negative electrode current collector 18 includes a negative electrode current collector tab 18a extending from one side of the negative electrode active material layer 17 opposite to the positive electrode current collector tab 14a, beyond the edge of the LDH separator 22. Hence, the single cell elements 11 can collect current from opposite sides through the positive electrode current collector tab 14a and negative electrode current collector tab 18a. The alkaline secondary battery 10 preferably further includes a negative electrode current collector plate 18b connected to an end of a negative electrode current collector tab 18a, and, it is more preferable that multiple negative electrode current collector tabs 18a be connected to one negative electrode current collector plate 18b. In this way, current can be collected with a simple and space-efficient configuration, and connection to the negative electrode terminal 18c is made easier. In addition, the negative electrode current collector plate 18b itself may be used as a negative electrode terminal. Typically, the edge of the negative electrode current collector tab 18a forms an exposed portion that is not covered by the LDH separator 22 and (if present) a liquid retention member 20. This allows for a desirable connection of the negative electrode current collector 18 (particularly the negative electrode current collector tab 18a) to the negative electrode current collector plate 18b and/or the negative electrode terminal 18c via the exposed portion. In this case, as shown in FIG. 11, the LDH separator 22 preferably covers or wraps the negative electrode active material layer 17 with a predetermined margin M (e.g., 1 to 5-mm spacing) so that the LDH separator 22 sufficiently hides the end on the negative electrode current collector tab 18a side of the negative electrode active material layer 17. This effectively prevents the extension of zinc dendrite from the end of the negative electrode active material layer 17 on the negative electrode current collector tab 18a side or its vicinity.

Preferred examples of the negative electrode current collector 18 include copper foil, copper expanded metal, and copper perforated metal, but a copper expanded metal is more preferable. In this case, for example, a negative electrode plate composed of a negative electrode and a negative electrode current collector can be preferably fabricated by applying a mixture containing zinc oxide powder and/or zinc powder and, if required, a binder (e.g., polytetrafluoroethylene particles) on a copper expanded metal. At that time, it is also preferable to stamp the dried negative electrode plate (i.e., the negative electrode and negative electrode current collector) to prevent the electrode active material from falling off and to improve the electrode density.

The alkaline secondary battery 10 as a zinc secondary battery preferably further includes a liquid retention member 20 that is located between the negative electrode active material layer 17 and the LDH separator 22 and covers or wraps the entire negative electrode active material layer 17. Hence, the electrolyte can exist evenly between the negative electrode active material layer 17 and the LDH separator 22, and hydroxide ions can be efficiently transferred between the negative electrode active material layer 17 and the LDH separator 22. The liquid retention member 20 may be any member that can hold electrolyte, but is preferably a sheet-like member. Preferred examples of the liquid retention member include non-woven fabrics, water-absorbent resin, liquid-retaining resin, porous sheets, and various spacers, but a non-woven fabric is particularly preferred in that it allows the negative electrode structure to be fabricated at low cost and to offer good performance. The liquid retention member 20 preferably has a thickness of 0.01 to 0.20 mm, more preferably 0.02 to 0.20 mm, even more preferably 0.02 to 0.15 mm, particularly preferably 0.02 to 0.10 mm, most preferably 0.02 to 0.06 mm. With a thickness within these ranges, a sufficient amount of electrolyte can be retained in the liquid retention member 20 while the overall size of the negative electrode structure is kept compact without waste.

Figure 10A:
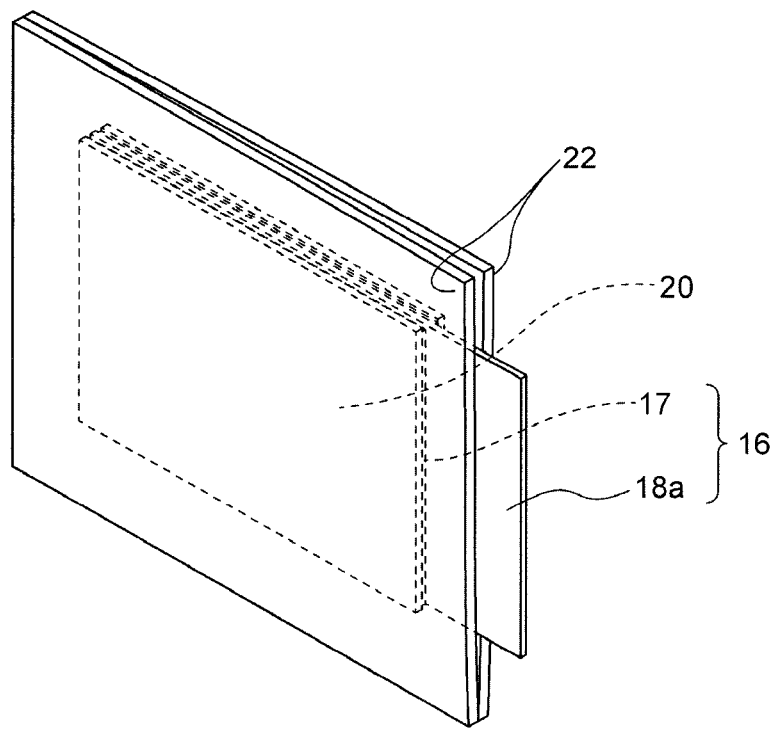
FIG. 10A is a perspective view of an example of a negative electrode plate supposed to be used in an alkaline secondary battery and having a negative electrode active material layer covered with an LDH separator.
Figure 10B:
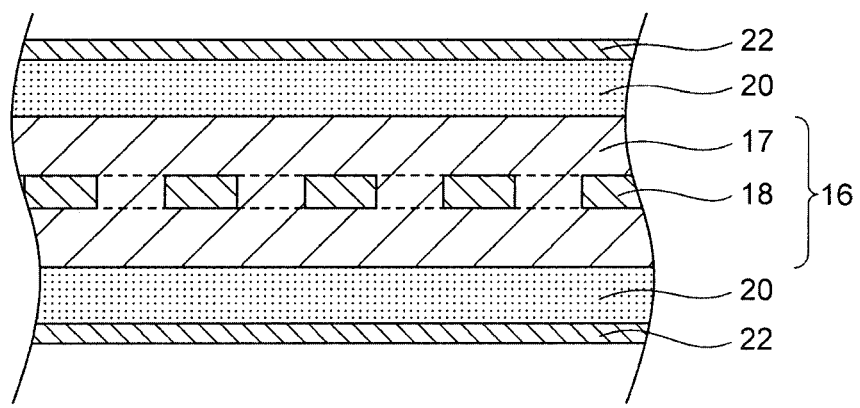
FIG. 10B is a schematic cross-sectional view of the layer structure of the negative electrode plate shown in FIG. 10A.

The entire negative electrode active material layer 17 is preferably covered or wrapped by the LDH separator 22. FIGS. 10A and 10B show a preferred mode of a negative electrode plate 16 in which the negative electrode active material layer 17 is covered or wrapped by the LDH separator 22. The negative electrode structure shown in FIGS. 10A and 10B includes a negative electrode active material layer 17, a negative electrode current collector 18, and, if required, a liquid retention member 20, and the entire negative electrode active material layer 17 is covered or wrapped with an LDH separator 22 (through the liquid retention member 20 as necessary). Wrapping or covering the entire negative electrode active material layer 17 with the LDH separator 22 (through the liquid retention member 20 as necessary) in this way eliminates the need for complicated sealing and bonding between the LDH separator 22 and the battery container as mentioned above, and enables fabrication of a zinc secondary battery (especially its stacked-cell battery) in which zinc dendrite extension can be prevented, in an extremely simple and highly productive manner.

In FIGS. 10A and 10B, the liquid retention member 20 is depicted as smaller than the LDH separators 22, but the liquid retention member 20 may be the same size as the LDH separators 22 (or folded LDH separator 22), and the outer edge of the liquid retention member 20 may reach the outer edges of the LDH separators 22. In other words, the outer periphery of the liquid retention member 20 may be sandwiched between the LDH separators 22 that constitute the outer periphery. In this case, the outer edges of the LDH separators 22 would be effectively sealed by thermal or ultrasonic welding as described below. In other words, rather than directly heat-welding or ultrasonically welding the LDH separators 22 to each other, indirectly heat-welding or ultrasonically welding the LDH separators 22 with a heat-weldable liquid retention member 20 between them is more effective in sealing, utilizing the heat-weldability of the liquid retention member 20 itself. For example, the end of the liquid retention member 20 to be sealed can be used as if it were a hot melt adhesive. A preferred example of a liquid retention member 20 in this case is a non-woven fabric, especially one made of thermoplastic resin (e.g., polyethylene or polypropylene).

The LDH separator 22 includes LDH and/or an LDH-like compound and a porous substrate. As mentioned above, the LDH plugs the pores of the porous substrate so that the LDH separator 22 exhibits hydroxide ion conductivity and gas impermeability (and hence functions as an LDH separator that exhibits hydroxide ion conductivity). It is preferable that the porous substrate be made of a polymeric material, and it is particularly preferable that the LDH be incorporated throughout the polymeric porous substrate in the thickness direction. For example, known LDH separators, such as those disclosed in Patent Literatures 3 to 6, can be used.

The number of LDH separators 22 for one negative electrode active material layer 17 is typically one per side (on both sides, two facing each other or one folded), but may be two or more. For example, several layers of LDH separators 22 may be used to cover or wrap the entire negative electrode active material layer 17 (which may be covered or wrapped by the liquid retention member 20).

As mentioned above, the LDH separator 22 has a quadrilateral shape (typically a square shape). The outer edges of at least two adjacent sides C of the LDH separator 22 (except for one side overlapping with the negative electrode current collector tab 18*a*) are closed. This allows the negative electrode active material layer 17 to be securely separated from the positive electrode plate 12, and prevents the extension of zinc dendrite more effectively. The reason why one side overlapping with the negative electrode current collector tab 18*a* is excluded from the side C to be closed is to make the negative electrode current collector tab 18*a* extendable.

According to a preferred mode of the present invention, each single cell element 11 is positioned so that the positive electrode plate 12, the negative electrode plate 16, and the LDH separator 22 are oriented vertically and one side C of the closed outer edge of the LDH separator 22 is located at the lower end, resulting in the positive electrode current collector tab 14*a* and the negative electrode current collector tab 18*a* extending horizontally from the opposite side ends of the single cell element 11. This makes it easier to collect current and removes obstacles from the upper open area when the upper one side of the outer edge of the LDH separator 22 is opened (which will be explained later), making it easier for gas to flow in and out between the positive electrode plate 12 and the negative electrode plate 16.

Incidentally, one or two sides of the outer edge of the LDH separator 22 may be open. For example, even if one side, the upper edge, of the LDH separator 22 is open, if electrolyte is injected so that it does not reach one side, the upper edge, during the fabrication of a zinc secondary battery, one side, the upper edge, will be free of electrolyte, thus avoiding the problems of leakage and zinc dendrite extension. In connection with this, each single cell element 11 is housed together with the positive electrode plate 12 in the case 28, which can be a sealed container, and is sealed with the lid part 28*d*, so that it can function as a major component of a sealed zinc secondary battery. Therefore, sufficient hermeticity can be ensured in the case 28, in which the single cell element 11 is to be ultimately housed, allowing the single cell element 11 itself to have a simple structure with an open top. Also, leaving one side of the outer edges of the LDH separator 22 open allows the negative electrode current collector tab 18*a* to be extended from there.

The outer edge of one side, which is the upper end of the LDH separator 22, is preferably open. This top-open structure can address the problem of overcharging in nickel-zinc batteries or other batteries. In other words, when a nickel-zinc battery is overcharged, oxygen ($O_2$) can be generated in the positive electrode plate 12, but the LDH separator 22 being so dense that it allows only hydroxide ions to pass through does not allow $O_2$ to pass through it. In this respect, the top-open structure allows $O_2$ to escape above the positive electrode plate 12 within the case 28 and be fed to the negative electrode plate 16 side through the top-opening, thereby oxidizing Zn in the negative electrode active material layer 17 with $O_2$ and returning it to ZnO. Through such an oxygen reaction cycle, use of a top-open type single cell element 11 in a sealed zinc secondary battery improves the overcharge resistance. Even if the outer edge of one side, which is the upper end of the LDH separator 22, is closed, providing ventilation holes in part of the closed outer edge is expected to provide the same effect as the aforementioned open-type structure. For example, ventilation holes may be opened after the outer edge of one side, which is the upper end of the LDH separator 22, is sealed, or a part of the aforementioned outer edge may be left unsealed during sealing so that the ventilation holes can be formed.

In any case, it is preferable that the closed side C of the outer edge of each LDH separator 22 be made by bending the LDH separator 22 and/or sealing the LDH separators 22 together. Preferred examples of sealing methods include adhesives, heat welding, ultrasonic welding, adhesive tapes, sealing tapes, and combinations thereof. In particular, since each LDH separator 22 containing a porous substrate of a polymeric material has the advantage of being flexible and therefore easy to bend, it is preferable that the LDH separator 22 be formed in a long shape and bent to close one side C of the outer edge. Heat welding and ultrasonic welding may be performed using commercially available heat sealers, for example; however, in the case of sealing LDH separators 22 together, it is preferable to perform heat welding and ultrasonic welding in such a way that the outer periphery of the liquid retention member 20 is sandwiched between the LDH separators 22 constituting the outer periphery, in order to accomplish more effective sealing. Although commercially available adhesives, adhesive tapes, and sealing tapes may be used, those containing resins with alkali resistance are preferred to prevent deterioration in alkaline electrolyte. From this perspective, examples of preferred adhesives include epoxy resin-based adhesives, natural resin-based adhesives, modified olefin resin-based adhesives, and modified silicone resin-based adhesives, but epoxy resin-based adhesives are more preferred for their particularly excellent alkali resistance. An example of an epoxy resin-based adhesive product is the epoxy adhesive Hysol (registered trademark) (manufactured by Henkel).

The electrolyte preferably contains an alkali metal hydroxide solution. The electrolyte is not shown in the drawing because it is spread over the entire positive electrode plate 12 (especially the positive electrode active material layer 13) and the negative electrode plate 16 (especially the negative electrode active material layer 17). Examples of alkali metal hydroxides include potassium hydroxide, sodium hydroxide, lithium hydroxide, and ammonium hydroxide, and potassium hydroxide is more preferred. A zinc compound such as zinc oxide or zinc hydroxide may be added to the electrolyte to suppress the self-dissolution of zinc and/or zinc oxide. As mentioned above, the electrolyte may be mixed with the positive electrode active material and/or the negative electrode active material to exist in the form of a positive electrode composite material and/or a negative electrode composite material. The electrolyte may also be gelled to prevent leakage of the electrolyte. A polymer that absorbs the solvent of the electrolyte and swells is preferably used as a gelling agent, and is a polymer such as polyethylene oxide, polyvinyl alcohol, or polyacrylamide, or starch.

What is claimed is:

1. A battery module comprising:
   a metal module housing that has a closed interior space; and
   multiple secondary batteries that have a vertically long shape and are housed vertically in the interior space and juxtaposed parallel to each other,
   wherein the module housing has an upper excess space above the secondary batteries in the interior space, the upper excess space being capable of mitigating a pressure increase in the module housing due to ignition of gas generated in the event of an abnormality in the secondary batteries, and
   wherein the secondary battery is a zinc secondary battery including:
   a stacked-cell battery in which multiple single cell elements having a configuration of an alkaline secondary battery are stacked, and
   a box-shaped case made of resin in which the stacked-cell battery is housed vertically, and
   wherein the secondary batteries further include, in top surfaces thereof, a pressure release valve capable of releasing gas from the secondary batteries at a predetermined working pressure or more, and
   wherein the battery module further includes a metal plate provided in a direction in which the multiple secondary batteries are juxtaposed, so as to cover the pressure release valve of the multiple secondary batteries from above.

2. The battery module according to claim 1, wherein the interior space is composed of a lower space constituting a lower part of the interior space with reference to top surfaces of the secondary batteries, and the upper excess space, and wherein $0.1 \leq V_U/(V_L+V_U) \leq 0.4$ is satisfied, where a volume of the lower space is $V_L$ and a volume of the upper excess space is $V_U$.

3. The battery module according to claim 1, wherein the module housing further includes a shield plate that defines a gas flow path, together with an inner surface of the module housing and outer surfaces of the secondary batteries, and
   wherein the gas flow path is configured to allow air for cooling the multiple secondary batteries to flow from one side of the module housing to the opposite side of the module housing through gaps between the secondary batteries that are adjacent and gaps between the secondary batteries and the shield plate.

4. The battery module according to claim 1, wherein the module housing has an air inlet located on the one side and an air outlet located on the opposite side, and the air outlet is provided with a cooling fan.

5. The battery module according to claim 1, wherein the inner bottom surface of the module housing has a recess, and the recess is configured to function as a gas flow path and be capable of receiving an electrolyte that may leak from the secondary batteries in the event of an abnormality in the secondary batteries.

6. The battery module according to claim 1, wherein the battery module further includes a fire-retardant plate and/or a heat-insulating plate between the secondary batteries that are adjacent.

7. The battery module according to claim 1, wherein the sides of each secondary battery are surrounded by one or more metal plates, and gaps between the sides of each secondary battery and the one or more metal plates form a part of the gas flow path.

8. The battery module according to claim 1, wherein the multiple secondary batteries are held being pressurized by each other in a direction in which the multiple secondary batteries are juxtaposed.

9. The battery module according to claim 8, wherein the pressurization is caused by fixing the shield plate.

10. The battery module according to claim 1, wherein the module housing has, in its side portions, multiple vulnerable portions having a smaller thickness than the other portions of the side portions, and the vulnerable portions are preferentially breakable with respect to the other portions due to an unacceptable increase in pressure in the module housing caused by ignition of gas generated in the event of an abnormality in the secondary batteries.

11. The battery module according to claim 1, wherein the zinc secondary battery is a nickel-zinc secondary battery.

12. The battery module according to claim 1, wherein each of the single cell elements includes:
- a positive electrode plate including a positive electrode active material layer;
- a negative electrode plate including a negative electrode active material layer including at least one material selected from the group consisting of zinc, zinc oxide, a zinc alloy, and a zinc compound;
- an LDH separator containing a layered double hydroxide (LDH) and/or an LDH-like compound; and
- an electrolyte,
- wherein the positive electrode active material layer and the negative electrode active material layer are separated from each other by the LDH separator.

13. The battery module according to claim 12, wherein the LDH separator contains an LDH and/or an LDH-like compound and a porous substrate, and the LDH plugs pores of the porous substrate so that the LDH separator exhibits hydroxide ion conductivity and gas impermeability.

* * * * *